May 15, 1956 W. KOHLHAGEN 2,745,287
METHOD OF BALANCING ROTARY MEMBERS
Filed Oct. 9, 1951 6 Sheets-Sheet 1

Inventor:
Walter Kohlhagen
by: Earle F. Stewart
Attorneys.

Inventor:
Walter Kohlhagen
by Earle Blemuel
Attorneys.

May 15, 1956 W. KOHLHAGEN 2,745,287
METHOD OF BALANCING ROTARY MEMBERS
Filed Oct. 9, 1951 6 Sheets-Sheet 3

Inventor:
Walter Kohlhagen
by: Earle T Stewart
Attorneys.

May 15, 1956 W. KOHLHAGEN 2,745,287
METHOD OF BALANCING ROTARY MEMBERS
Filed Oct. 9, 1951 6 Sheets-Sheet 4
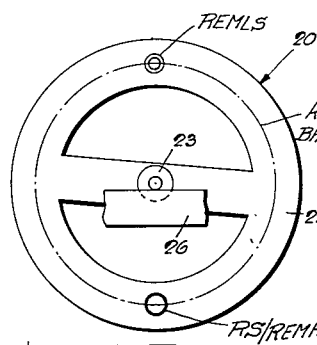
Fig. 35
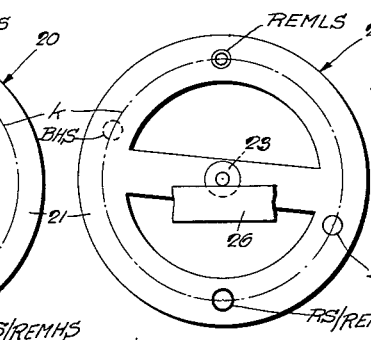
Fig. 36
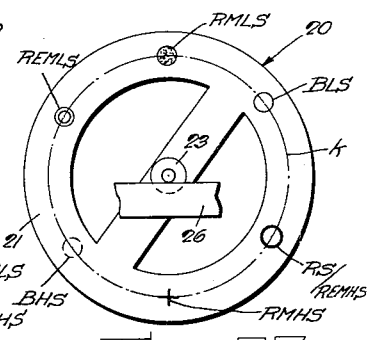
Fig. 37
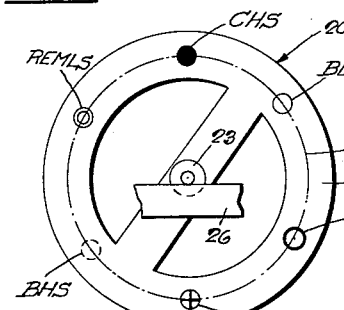
Fig. 38
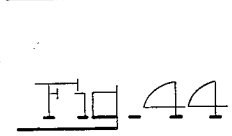
Fig. 44
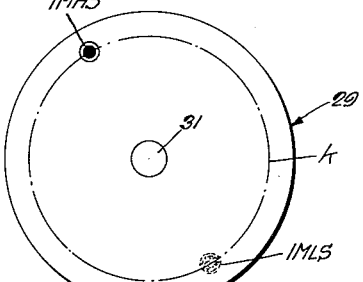
Fig. 40 / Fig. 45
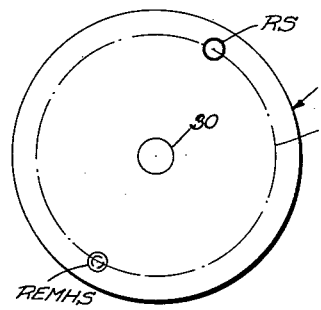
Fig. 41
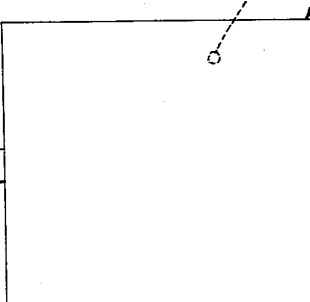
Fig. 39
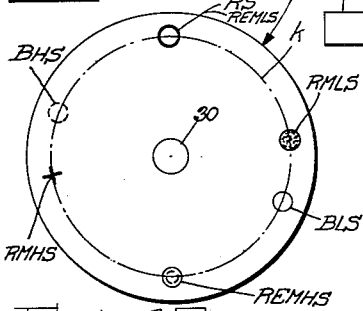
Fig. 42 / Fig. 46
Inventor:
Walter Kohlhagen
by: Earle T[illegible]
Attorneys.

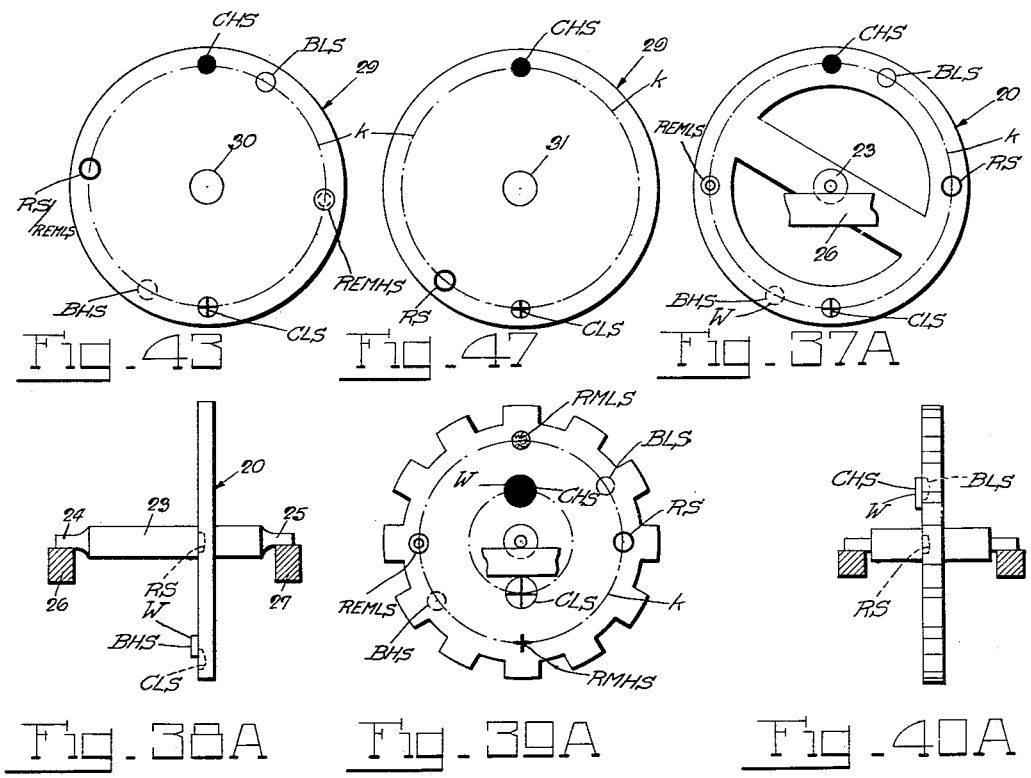

LEGEND

- ⊛ IMLS = INHERENT MEAN LIGHT SPOT
- ● IMHS = INHERENT MEAN HEAVY SPOT  } = IMUS = INHERENT MEAN UNBALANCE SPOTS
- ○ RS = REDUCING SPOT
- ◎ REMLS = REDUCED MEAN LIGHT SPOT
- ◉ REMHS = REDUCED MEAN HEAVY SPOT
- ○ BLS = BALANCING LIGHT SPOT
- ◌ BHS = BALANCING HEAVY SPOT  } = BS = BALANCING SPOTS
- ⊕ RMLS = RESULTANT MEAN LIGHT SPOT
- + RMHS = RESULTANT MEAN HEAVY SPOT  } = RMUS = RESULTANT MEAN UNBALANCE SPOTS
- ⊕ CLS = CORRECTING LIGHT SPOT
- ● CHS = CORRECTING HEAVY SPOT  } = CS = CORRECTING SPOTS

Inventor:
Walter Kohlhagen by: Earle F. Kennel
Attorneys.

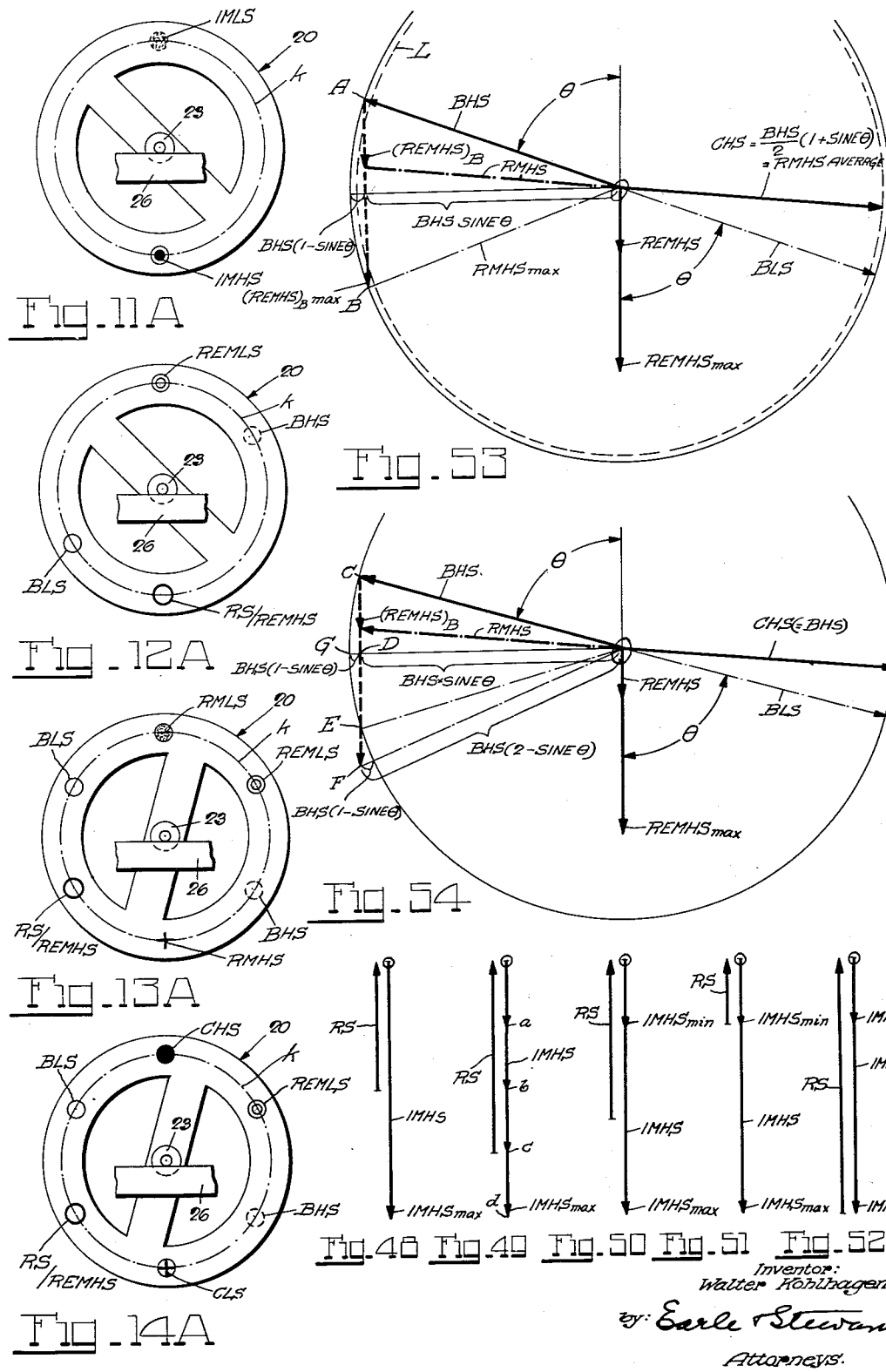

United States Patent Office 2,745,287
Patented May 15, 1956

2,745,287

METHOD OF BALANCING ROTARY MEMBERS

Walter Kohlhagen, Elgin, Ill.

Application October 9, 1951, Serial No. 250,449

6 Claims. (Cl. 73—481)

The present invention relates to improvements in methods for balancing oscillating or rotating members, and while the method of the present invention is admirably suited for the poising or balancing of the oscillating balance-wheels of clocks, watches and other time instruments, it is also suitable for balancing other oscillating or rotating members such, for instance, as flywheels, turbine wheels, the rotating members of electric motors, etc.

This invention is an improvement upon the balancing method disclosed in my prior Patent No. 2,554,033, dated May 22, 1951. This prior method involves the orientation of a member wherewith any inherent out-of-balance thereof will be revealed by an Inherent Mean Heavy Spot moving to the bottom, followed by a primary weight-changing operation effected by substracting or adding a known amount of material at a point such that a Balancing Light Spot effect is produced at a known acute angle from the Inherent Mean Heavy Spot, followed, in turn, by a further balancing operation during which the member rotates through some undetermined angle dependent upon the relationship of the moment of force established by the Inherent Mean Heavy Spot and the moment of force established by the removal or addition of material in the primary weight-changing operation, and finally a known amount of material is removed from or added to the member at a predetermined point on the vertical line through the axis thereof. Accordingly, this prior method is characterized in that in a first position of rotation of a member and by means of a primary weight-changing operation, the weight of the member is changed by a known amount at a known radial distance and at predetermined angle from the vertical line, followed by a second weight-changing operation at a second position of rotation of the member and by a known amount and at a known radial distance on the vertical line, whereby the member can be brought within a predetermined tolerance of accuracy with respect to its balance or poise. The prior method mentioned above is well suited for balancing within a predetermined tolerance of accuracy all members of a lot the inherent unbalance of which does not exceed a certain maximum inherent unbalance. This prior method is, furthermore, well suited for balancing within a predetermined tolerance of accuracy all members of a lot the inherent unbalance of which lies within a range between a certain maximum inherent unbalance and a certain minimum inherent unbalance other than zero.

It is an object of the present invention to devise a method of balancing rotary or oscillatory members which has all the advantages of my above-mentioned prior method, yet is superior to this prior method by permitting the balancing within a predetermined tolerance of accuracy of a member having considerably greater inherent unbalance than the maximum permissible inherent unbalance of a member that could be balanced by my prior method to the same tolerance of accuracy.

It is another object of the present invention to devise a method of balancing a rotary or oscillatory member of a certain inherent unbalance to a considerably finer tolerance of accuracy than that attained if the same member were balanced in accordance with my prior method.

A further object of the present invention is to devise a method of balancing within a predetermined tolerance of accuracy all members of a lot, the inherent unbalance of which lies within a much wider range between a maximum inherent unbalance and a minimum inherent unbalance than the maximum range of unbalance permitted by my prior method for the balancing of members within the same tolerance of accuracy.

Another object of the present invention is to devise a method of balancing a rotary or oscillatory member to within a predetermined tolerance of accuracy, without requiring as accurate location of the spots on the member where material is to be removed or added, as would be required if the same member were balanced to the same tolerance of accuracy by my prior method.

It is still another object of the present invention to provide in the instant method for corrective weight-changing operations at three places of a rotary or oscillatory member without, however, incurring any overlay, in toto or in part, of the cuts therein or weight additions thereto even if they are provided on the same face and at the same radius of the member.

Further objects and advantages will appear to those skilled in the art from the following, considered in conjunction with the accompanying drawings.

In the accompanying drawings, in which certain modes of carrying out the present invention are shown for illustrative purposes:

Figure 1:
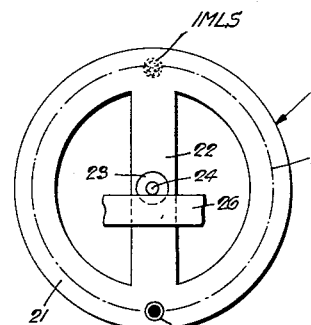
Fig. 1 is a schematic face view of a balance wheel for a time instrument, showing the wheel mounted for gravity orientation preparatory to being balanced in accordance with the present method.
Figure 8:
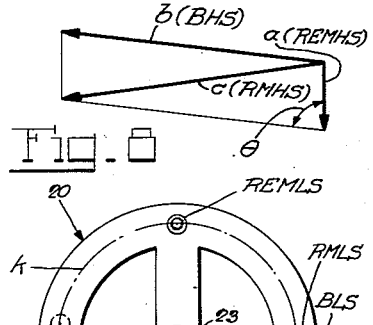

Figs. 3 to 7, inclusive, are views similar to Fig. 1, showing the balance wheel in progressive stages, respectively, of a balancing operation performed thereon in accordance with the present method;

Fig. 8 is a vector diagram indicating the relation between some of the factors involved in the present method;

Figs. 9 to 14, inclusive, are schematic face views of a balance wheel, showing the same in progressive stages, respectively, of a balancing operation performed thereon according to the present method, the instant balancing operation distinguishing from that shown in Figs. 3 to 7 in that the present wheel has a greater initial unbalance;

Figs. 11A to 14A, inclusive, are face views of a similar balance wheel, showing the same in progressive stages, respectively, of a balancing operation performed thereon according to a modification of the present method;

Figs. 15 to 20, inclusive, are schematic face views of a balance wheel, showing the same in progressive stages, respectively, of a balancing operation performed thereon, in accordance with the present method, the instant balancing operation being distinguished from the previous balancing operations herein by having alike all cuts, or weight additions if these are desired in lieu of cuts;

Figs. 21 to 26, inclusive, are schematic face views of a balance wheel, showing the same in progressive stages, respectively, of the same balancing operation performed thereon as in Figs. 15 to 20, with the balance wheel having, however, a greater initial unbalance;

Figs. 27 to 32, inclusive, are schematic face views of a balance wheel, showing the same in progressive stages, respectively, of a balancing operation performed thereon in accordance with the present method, the instant balancing operation being distinguished from the previous balancing operations herein in that the wheels have initial unbalances lying within a range the lower limit of which is above zero;

Figs. 33 to 38, inclusive, illustrate the same balancing operation performed on a wheel as in Figs. 27 to 32, the wheel having, however, a greater initial unbalance than the exemplary wheel in Figs. 27 to 32;

Fig. 39 is a front view of a member requiring dynamic balancing;

Figs. 40 to 43, inclusive, are views of one end of the member of Fig. 39, illustrating progressive steps, respectively, of the present method performed thereon toward dynamically balancing the member;

Figs. 44 to 47, inclusive, are views of the opposite end of the member of Fig. 39, illustrating progressive steps, respectively, of the present method performed thereon for completing the dynamic balancing of the member;

Figs. 37A and 38A are schematic face and edge views, respectively, of a balance wheel which has been balanced in accordance with the present method, by making a first cut therein, adding weight to the wheel as an intermediate step in the method, and removing material from the wheel as the final step in the method;

Figs. 39A and 40A are schematic face and edge views, respectively, of a balance wheel which has been balanced in accordance with the present method, by removing material from the wheel as the first two steps in the method, and adding weight to the wheel as the final step in the method;

Figs. 48 to 52, inclusive, show different sets of certain comparative vectors, respectively; and Figs. 53 and 54 are different vector diagrams.

As will appear from the following, various modes of carrying out the present invention may be employed, though for illustrative purposes only a few modes will be described, i. e., removing material from a member to be balanced at three different locations therein, first removing material from a member to be balanced, then adding material thereto, and finally removing material therefrom, and first removing material from a member to be balanced at two different locations and subsequently adding material to the member.

*The method as illustrated in Figs. 1 to 7, inclusive, and in Figs. 9 to 14, inclusive*

In Figs. 1 to 7 inclusive is illustrated a balance-wheel generally designated by the reference character 20 and comprising an annular rim 21 and an integral diametrical spoke 22—a form of balance-wheel common in the horological art.

Figure 2:
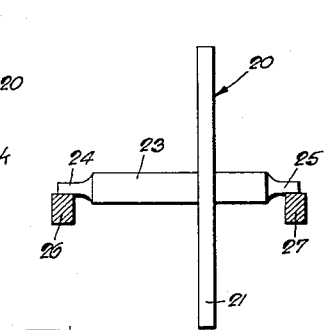
Fig. 2 is an edge view of the mounted balance wheel.

Rigid with and extending through the central portion of the spoke 22 of the balance-wheel 20 is a balance-staff 23 projecting beyond each of the respective opposite faces of the balance-wheel and having its longitudinal axis perpendicular with respect to the plane of the balance-wheel, as is especially well shown in Fig. 2.

At each of its opposite ends, the balance-staff 23 is, in accordance with usual practice in the horological art, reduced in size to provide bearing-terminals 24 and 25 respectively located at the opposite extremities of the said balance-staff, as is shown in Fig. 2.

For purposes as will hereinafter appear, the bearing-terminals 24 and 25 of the balance-staff 23 are adapted to rest respectively on the upper surfaces of poising-bars 26 and 27 arranged parallel with but spaced from each other in a horizontal plane.

For simplicity of this initial illustration, it will be assumed that the several drillings are to be performed on a common circle $k$, that is, at equal radial distances; and the various weight times radius (hereinafter sometimes abbreviated as "weight$\times$radius" or "W$\times$R") effects will be considered as centered upon this same circle $k$ which may be regarded as the "unit-circle." Such a simplified procedure is frequently desirable with fine watch balance-wheels when the dimensions of a rim do not permit appreciable radial change of location for the drilling of holes or the addition of weights. It will be understood, however, that the unbalance is a state determined by the weight and the radial distance of the effective center of this weight from the center of rotation, and hence an unbalance may be properly defined as having a "weight$\times$radius" value.

To secure commercially accurate operation of a balance-wheel such as 20 in a horological instrument, a measurable amount of unbalance is permissible, though it must be minute in amount. For purposes of convenience of description, this permissible amount of unbalance will be sometimes hereinafter referred to as a "Unit of Permissible Unbalance," which is a value established by a weight acting at a radial distance. In this illustrated form, the distance is the radius of the unit-circle $k$, and the weight will correspondingly be taken as one unit.

As before noted, the Unit of Permissible Unbalance is intended to connote an amount of unbalance such as will not cause unsatisfactory performance of the balance-wheel 20 or its equivalent oscillating or rotary member, and will, on occasion, be hereinafter referred to by the reference characters UOPU.

Before proceeding with a description of the balancing or poising of the balance-wheel 20, it may here be noted that rarely does a balance-wheel such as 20 possess, as manufactured, an error of more than 15 Units of Permissible Unbalance, and more often far less. It will be understood, however, that the employment of the method is not limited to cases where the manufacturing error does not exceed fifteen times the permissible error, since by choice of relationships of known weight$\times$radius values and of known angles, the unbalance of any device can be reduced.

For purposes of description, it may be assumed that the balance wheel 20 has no inherent or initial unbalance, this being at the time unknown, since the wheel 20 was not previously poised and the wheel is, furthermore, only one of a lot or group of wheels to-be-balanced the inherent unbalance of which is known to vary within a range between a minimum inherent unbalance of 0 Units of Permissible Unbalance and, say, 30 Units of Permissible Unbalance. To start with, the wheel 20 to be presently balanced is placed with its bearing terminals 24 and 25 on the poising bars 26 and 27, respectively, and permitted to roll into a position of equilibrium (Figs. 1 and 2) in which the inherent unbalance of the wheel would be centered on the unit circle $k$ in what may be termed an "Inherent Mean Heavy Spot" represented in the drawings by the reference character IMHS.

The movement of the balance wheel 20 as just described will serve to definitely locate the Inherent Mean Heavy Spot IMHS, if any, as well as the diametrically opposite Inherent Mean Light Spot IMLS. In the present instance and unbeknown to the operator, there is, of course, no effective IMHS since the present wheel has in this example no inherent unbalance. The location of the IMHS, even through bearing in this instance no relation to any unbalance of the present inherently balanced wheel, is nevertheless an imperative starting spot for balancing the wheel in accordance with the present method. Thus, it is at the location of the IMHS (Fig. 1) where the first cut is undertaken. This first cut, undertaken by a drill or any other suitable cutting implement, will leave the wheel at the former location of the IMHS with a "Reducing Spot" designated by the reference character RS in the drawings (Fig. 3).

In order that the balancing method about to be described further, will balance all wheels of the lot to within the permissible remaining unbalance, it is in this instance preferred that the first or reducing cut removes from each wheel material which is equivalent to the median number of Units of Permissible Unbalance of the range of inherent unbalances of the lot. Since the exemplary range of the inherent unbalances of the wheels of the present lot lies between a minimum of 0 UOPU and a maximum of 30 UOPU, as mentioned, the first or reducing cut equals 15 UOPU in this instance.

Figure 3:
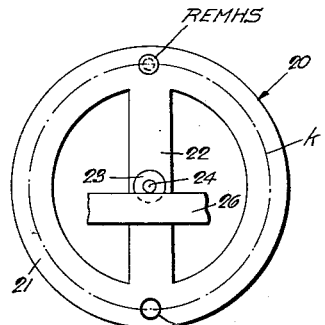

On providing the inherently balanced wheel 20 with the first or reducing cut of 15 UOPU at the location RS in Fig. 3, there is formed diametrically opposite RS a heavy spot of 15 UOPU which may be considered to be centered in a "Reduced Mean Heavy Spot" identified by the reference character REMHS. The entire unbalance then remaining in the wheel may be considered to be centered in the Reduced Mean Heavy Spot REMHS. On releasing the wheel 20 in Fig. 3 from restraint, the same will roll into the position shown in Fig. 4 in which the REMHS comes to rest vertically beneath the staff 23 of the wheel.

Figure 4:
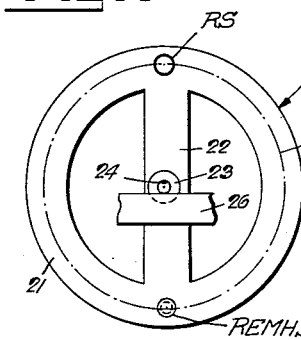
Figure 5:
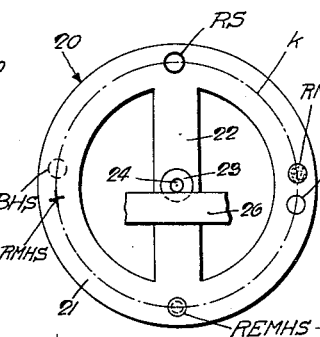
Figure 6:
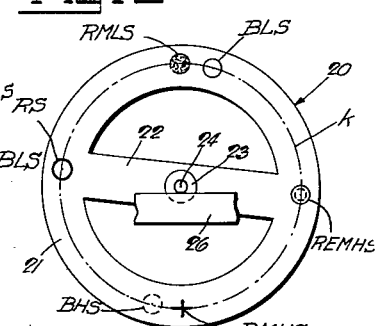
Figure 7:
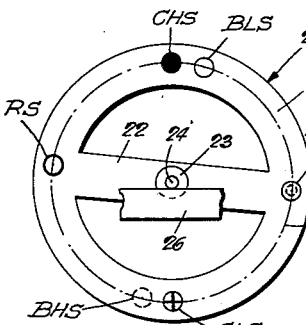

Following the movement of the balance-wheel 20 into the position indicated in Fig. 4, a "Balancing Light Spot" designated by the reference character BLS is formed in the balance-wheel on the unit-circle $k$ at a point (in the present illustrative instance) 82° 49' (angle $\theta$) displaced from the Reduced Mean Heavy Spot REMHS as is shown in Fig. 5. The formation of BLS results in the creation of a Balancing Heavy Spot BHS of the same weight×radius value as BLS. BHS may be considered to be centered on the unit-circle $k$ at a point thereon diametrically opposite BLS, as is indicated in Figs. 5, 6 and 7. In the present illustrative instance, BHS is therefore displaced 97° 11' from REMHS.

The Balancing Light Spot BLS may, like the Reducing Spot RS, be formed by a drill or any other suitable cutting implement. The amount of material removed to produce the Balancing Light Spot BLS will, in the present instance, be taken as several times the maximum inherent unbalance of the wheels of the lot. Thus, BLS (and BHS) may, in the present instance, be considered to have a weight×radius value of 60 Units of Permissible Unbalance and to be formed on the unit-circle $k$.

The removal of material to produce the Balancing Light Spot BLS (Fig. 5) will, as before noted, cause the appearance, in the balance-wheel 20 at a point on the unit-circle centered diametrically opposite BLS, of a Balancing Heavy Spot BHS having a weight×radius value corresponding to the weight×radius value of the Balancing Light Spot BLS, i. e., 60 UOPU.

The Balancing Heavy Spot BHS and the Reduced Mean Heavy Spot REMHS may now be considered to combine to produce what may be termed a "Resultant Mean Heavy Spot" RMHS located intermediate BHS and REMHS as is indicated in Figs. 5 and 6. There will also be produced a "Resultant Mean Light Spot" RMLS at a location diametrically opposite RMHS and corresponding thereto in weight×radius value.

Now when the balance-wheel 20 as shown in Fig. 5, is relieved of restraint, it will turn and assume the position substantially as shown in Fig. 6, in which BHS was swung toward the lowermost point, while the relatively-lighter REMHS has swung upwardly into a position adjacent the horizontal. The Resultant Mean Heavy Spot will now have located itself at the lowermost point (illustratively being the spot RMHS) on the unit-circle $k$ directly below the balance-staff 23 (Fig. 6).

The degree of movement of the balance-wheel between the position in which it is shown in Fig. 5 and the position in which it is shown in Fig. 6 will, of course, depend upon the amount of movement required to cause BHS to counterbalance the lighter REMHS.

If after the balance-wheel 20 has been brought into the condition in which it is shown in Fig. 5, RMHS is located in any suitable manner such, for instance, as by permitting it to reorient itself by gravity to the position of Fig. 6, RMHS will have a weight×radius value of 60 UOPU when REMHS has a weight×radius value of 15 UOPU and BHS has a weight×radius value of 60 UOPU as already referred to. That is, if a parallelogram is drawn as in Fig. 8, with one side $a$ equal to the weight×radius value of REMHS or 15 units, and another side $b$ equal to the weight×radius value of BHS or 60 units, and the angles 82° 49' and 97° 11' between its sides, the minor diagonal $c$ has a length of 60 units, which is the weight×radius value of the resultant RMHS. If now a correcting cut is formed substantially coincident with RMHS and with a weight×radius value (60 UOPU) corresponding to the value assigned to BLS, the balancewheel resulting, as here being considered and as illustrated in Fig. 7, will have perfect balance or poise. The correcting cut, being formed by a drill or other suitable cutting implement, will leave in the wheel a Correcting Light Spot CLS diametrically opposite to which may be considered to be a Correcting Heavy Spot CHS of the same weight×radius value. Thus, although the wheel 20 was inherently balanced and was unbalanced during its subjection to the instant balancing method, the wheel is nevertheless restored to perfect balance after its subjection to the balancing method. Other appropriate values for CLS will immediately suggest themselves once a parallelogram like that of Fig. 8 is laid out with the selected weight×radius value for BHS and the selected acute angle ($\theta$).

Let it now be assumed with respect to the showing of Figs. 1 to 7, inclusive, that the value of REMHS is 7.5 UOPU, while the value of RS remains at 15 UOPU and the values of BLS, BHS, CLS and CHS remain at 60 UOPU. Under these circumstances, in the parallelogram having the same angles between the sides as before, and with side $b$ equal to 60 units as before but with side $a$ equal to 7.5 units, the minor diagonal or resultant RMHS will have a value of 59.53 UOPU. Now when CLS is formed coincident with RMHS and with a value, as before referred to, equal to BLS (60 UOPU), the remaining error in the balance-wheel 20 will be only 0.47 UOPU—well within the range of permissible degree of unbalance.

Figure 9:
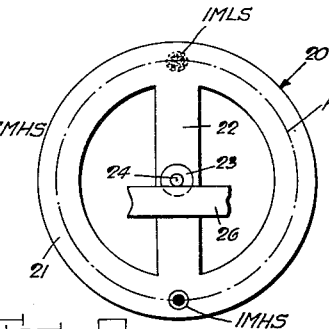
Figure 10:
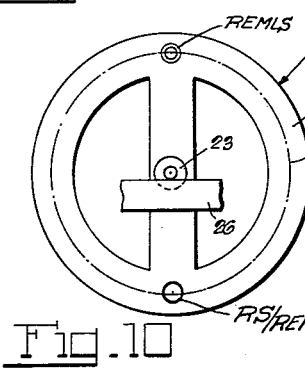

Reference is now had to Figs. 9 to 14, inclusive, which show in progressive stages the balancing by the method just described of another wheel 20 of the same lot having, however, an inherent unbalance equal to the maximum inherent unbalance of any wheel of the lot, i. e., 30 UOPU. Thus, the IMHS of the wheel 20 will be located vertically beneath the staff 23 thereof when the wheel is permitted to orient itself by gravity on the poising bars (Fig. 9). Next, a reducing cut is taken at the location of the IMHS, leaving the wheel with the Reducing Spot RS (Fig. 10). As previously mentioned, the reducing cut is, in this instance, made equal to the weight×radius value of the mean unbalance of the range of initial unbalances of the members of the lot. Accordingly, since the present wheel is from the same lot as the previous wheel (Figs. 1 to 7), the reducing cut equals 15 UOPU, leaving at RS a Reduced Mean Heavy Spot REMHS of 15 UOPU (Fig. 10). Diametrically opposite REMHS and on the same-unit circle $k$ may be considered to be a Reduced Mean Light Spot REMLS of the same weight×radius value as REMHS. Subsequently, the wheel is permitted to orient itself by gravity, whereby the wheel will assume the position shown in Fig. 11 in which the REMHS is vertically below the staff 23 of the wheel.

Figure 11:
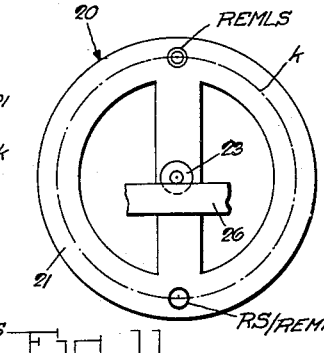
Figure 12:
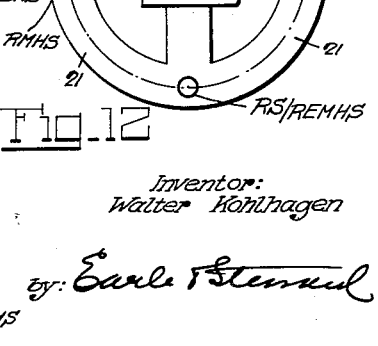

Following the orientation of the wheel as indicated in Fig. 11, a Balancing Light Spot BLS is formed in the wheel at the unit circle $k$ at the same standard angle as before (angle $\theta$=82° 49') from the Reduced Mean Heavy Spot REMHS (Fig. 12). As in the previous balancing operation, the material removed from the wheel at the Balancing Light Spot BLS equals 60 UOPU. The formation of the BLS in the wheel will result in the creation of a diametrically opposite Balancing Heavy Spot BHS of the same weight×radius value on the unit circle $k$.

Figure 13:
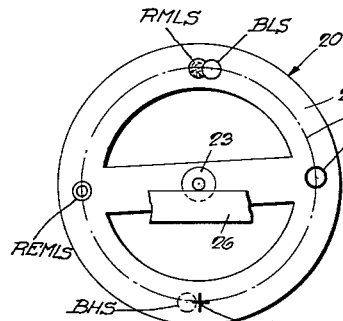

The wheel is next permitted to reorient itself by gravity into the position shown in Fig. 13 in which the Balancing Heavy Spot BHS and the Reduced Mean Heavy Spot REMHS combine to produce a Resultant Mean Heavy Spot RMHS intermediate BHS and REMHS and vertically beneath the staff 23 of the wheel. As a result of the creation of the RMHS, there will also be produced diametrically opposite thereto a Resultant Mean Light Spot RMLS. It follows from the vector diagram of Fig. 8 that the Resultant Mean Heavy Spot RMHS will, in the present instance, have a weight×radius value of 60 UOPU, since the REMHS has a weight×radius value of 15 UOPU and the BHS has a weight×radius value of 60 UOPU. If now a correcting cut is formed substantially coincident with RMHS and with a weight×radius value of 60 UOPU, corresponding to the weight×radius value of BLS, the balance wheel (Fig. 14) will have perfect balance or poise. The correcting cut CLS will result in the creation of a diametrically opposite Correcting Heavy Spot CHS of the same weight×radius value.

Figure 14:
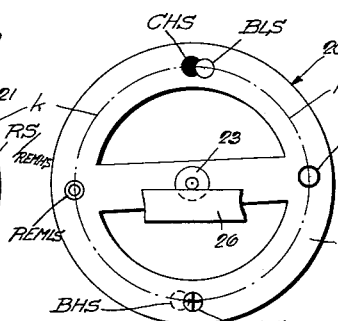

Considering now the balancing operation of Figs. 9 to 14, for instance, it is obvious that the wheel 20 could also be balanced by adding weight thereto instead of removing material therefrom. Thus, instead of providing the first or reducing cut RS of 15 UOPU, weight of the same weight×radius value could be added to the wheel at the Inherent Mean Light Spot IMLS (Fig. 9). Further, instead of removing material equivalent to 60 UOPU at BLS, material of the same weight×radius value could be added to the wheel at the Balancing Heavy Spot BHS (Fig. 12). Finally, instead of removing material equivalent to 60 UOPU at RMHS, material of the same weight×radius value could be added to the wheel at the Resultant Mean Light Spot RMLS (Figs. 13 and 14).

It is self-evident from the foregoing that the same wheel 20 could also be balanced by a combination of cuts and weight additions, however desired. For instance, the wheel 20 could be balanced by creating the REMHS by a reducing cut, then adding weight to the wheel at BHS, and finally providing the correcting cut at CLS.

From the foregoing it will be apparent that the method carried out in the manner illustrated in Figs. 1 to 7 or in Figs. 9 to 14 produces remaining degrees of unbalance which are all within the permissible range, when the balance-wheel prior to being subjected to the described steps, has an unbalance somewhere between zero and 30 units, and delivers a perfectly corrected balance when the original error was either zero, fifteen or thirty units, with the stated values of the Balancing and Correcting Spots of 60 UOPU each, and with the angle of the Balancing Light Spot BLS from the vertical (that is, from REMHS) being 82° 49'.

It may also be pointed out that a balance-wheel having an original error of 32 or 33 UOPU, for instance, can be subjected to the identical treatment, wherewith the resultant RMHS has a weight×radius value less than 61 UOPU and hence a Correcting Light Spot CLS of 60 units value will produce a balance-wheel within the permissible range.

It is also to be noted that since BLS and CLS are to have the same values, as above described, they both may be produced by the identical drill or other cutting-tool. Hence, should the drill or other cutting-tool inadvertently be employed for too long a period and as a consequence wear down from its holes, the values of BLS and CLS will still remain the same relative to each other and no appreciable deviation from the effects above described will occur.

To secure essentially perfect poise in a balance-wheel when the two spots BLS and CLS have the same weight×radius value and IMHS equals either zero, the mean, or the maximum expected value of unbalance, the cosine of the angle ($\theta$) between REMHS and BLS should essentially equal $$\frac{\text{REMHS maximum}}{2\text{BLS}}$$

or its equivalent $$\frac{\text{REMHS average}}{\text{BLS}}$$

In the showing of Figs. 1 to 7 and Figs. 9 to 14, the various values were arbitrarily chosen for illustrative purposes, i. e., IMHS=zero and 30 UOPU; BLS=60 UOPU; and CLS=60 UOPU. With such a mode of procedure, the nature of the results (satisfactory or unsatisfactory) may be ascertained by laying out a parallelogram as previously explained, or by the use of vector diagrams or mathematical formulas as more fully explained in the "RESUME" hereof.

*The method as illustrated in Figs. 11A, 12A, 13A and 14A*

It is now proposed to consider a set of circumstances wherein each of a lot of balance-wheels such as 20 is provided with a Correcting Light Spot having a weight×radius value slightly less than the similar value of the Balancing Light Spot.

For this illustration, the range of the initial unbalances occurring in the members of the lot may be considered to be from 0 to 30 UOPU as before. The weight×radius effects may again be considered as being present at or established at the unit-circle $k$. The Balancing Light Spot BLS will be selected for a weight×radius value of 15 UOPU rather than the 60 UOPU previously referred to. Applying the formula just above, the cosine of the angle between REMHS and BLS equals 15÷(2×15) or 0.50 and hence angle $\theta$ equals 60°.

The particular balance-wheel having an assumed IMHS of 30 UOPU (Fig. 11A) may be allowed to turn itself on the poising-bars, so that IMHS is at the bottom. A reducing cut RS of 15 UOPU, i. e., the mean of the range of initial unbalances of the members of the lot, is next undertaken at the location of IMHS, leaving the wheel with a Reduced Mean Heavy Spot REMHS of a weight×radius value of 15 UOPU (Fig. 12A). After permitting the wheel to reorient itself by gravity so as to locate the REMHS vertically below the staff of the wheel, BLS with a weight×radius value also of 15 UOPU will be drilled at an angle of 60° from REMHS as indicated in Fig. 12A. The formation of BLS will result in BHS also having a value of 15 UOPU and of the appearance between BHS and REMHS, of the Resultant Mean Heavy Spot RMHS also with a value of 15 UOPU. This RMHS value may be conveniently ascertained by laying out a parallelogram similar to Fig. 8 but with appropriately altered values, or by formula or vector diagrams to be later explained in the Résumé.

When released from restraint and permitted to orient itself by gravity, the balance-wheel as shown in Fig. 12A will turn to bring RMHS down to the intersection of the vertical center line with the unit-circle $k$ as shown in Fig. 13A. Now if CLS is produced upon the site of RMHS as indicated in Fig. 14A (or upon a radial line substantially coincident therewith) and with a weight×radius value of 14 UOPU, the remaining unbalance in the balance-wheel will amount to 1 UOPU. Thus, the balance-wheel at the completion of the operation shown in Fig. 14A will be one suitable for use under the standards previously set.

Now with the angular relationship of 60° remaining between REMHS and BLS, the same as above described, let it be assumed that in another member of the lot of balance-wheels, IMHS has a value which will leave the member with a Reduced Mean Heavy Spot of only 7.5 UOPU after the first or reducing cut RS of 15 UOPU at the location of IMHS, while the value of BLS (and hence BHS) remains at 15 UOPU and CLS remains at 14 UOPU.

Under these conditions and after BLS has been formed, RMHS will have a weight×radius value of almost exactly 13 UOPU (as may be determined in a manner above referred to), and will, of course, be located further away from REMHS than was the case previously. Now when CLS with a value of 14 UOPU is cut on the site of RMHS (or on a radial line substantially intersecting it), the remaining degree of unbalance will be 1 UOPU, represented by the difference between RMHS (13 UOPU) and CLS (14 UOPU).

When a balance-wheel of the lot has an IMHS value of 15 UOPU and, hence, an REMHS value of zero, the formation of a BLS of 15 UOPU will create a BHS also with a value of 15 UOPU. Now when CLS with a value of 14 UOPU is formed on a radial line substantially coincident with the site of BHS (diametrically opposite BLS), the now-remaining unbalance will amount to but 1 UOPU.

In this form of practice, balance-wheels having original unbalances (IMHS) of about 17.3 and about 27.7 weight×radius values each, will, upon treatment, have a Resultant Mean Heavy Spot (RMHS) effect of exactly 14 units, so that when formed with CLS of 14 units, these balance-wheels will be made essentially perfect by the treatment referred to.

Again each member of the chosen lot of similar members may be subjected to the identical poising or balancing treatment and satisfactory balancing accomplished.

For modes of determining various values, reference may be had to the Résumé.

In the hereinbefore described exemplary balancing operations, except that of Figs. 11A to 14A, the first or reducing cut was smaller in UOPU value than the remaining cuts of identical UOPU value. Following is an example of a balancing operation in which all cuts (or weight additions) are alike in UOPU value, and all cuts are, as in the hereinbefore described exemplary balancing operations, provided on a unit circle $k$.

*The method as illustrated in Figs. 15 to 20, inclusive, and in Figs. 21 to 26, inclusive*

The balance wheel 20 shown in these figures may be considered to be one of a plurality or lot of balance wheels which are to be balanced according to the present method, and the initial or inherent unbalances of which may vary from 0 to a maximum of 20 UOPU. Accordingly, the range of unbalances of the members of the instant lot is from 0 to 20 UOPU, and the preferred value of the Reducing Spot RS is accordingly 10 UOPU, i. e., the mean unbalance of the range of initial unbalances of the members of the lot. Further, and as already mentioned, the balancing operation about to be described differs from the previously described balancing operations in that all cuts (or weight additions) are alike. Thus, in the present example, the cuts BLS and CLS are made equal to RS, i. e., 10 UOPU.

Figure 15:
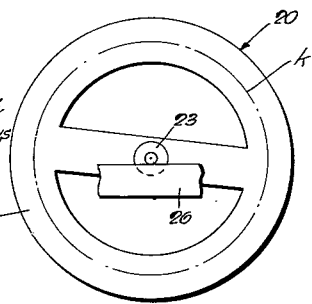
Figure 16:
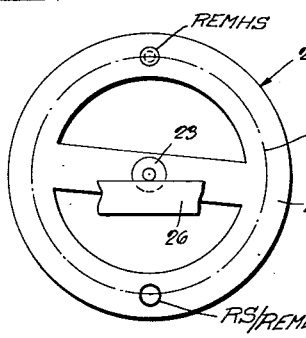

Let it now be assumed that the wheel 20 of Fig. 15 has no initial or inherent unbalance, the same will, therefore, have no actual Inherent Mean Heavy Spot IMHS when the wheel is poised on the poising bars. Nevertheless the intersection of the vertical diametric line of the wheel with the unit circle $k$ thereof will serve as a reference point at which the first or reducing cut is undertaken to leave the wheel with the Reducing Spot RS (Fig. 16). Since the removal of material at RS equals 10 UOPU, as above mentioned, there is created diametrically opposite RS and on the same unit circle $k$ a Reduced Mean Heavy Spot REMHS of the same weight×radius value, i. e., 10 UOPU. If the wheel 20 is then permitted to reorient itself by gravity, the same will turn to the position shown in Fig. 17 in which REMHS is bottommost.

Figure 17:
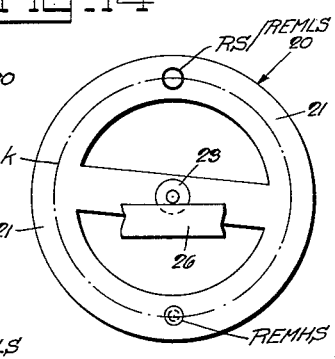
Figure 18:
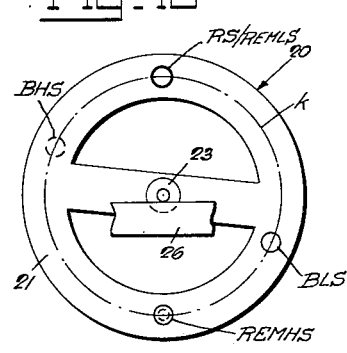

Following the rotation of the balance wheel 20 into the position shown in Fig. 17, a Balancing Light Spot BLS of a value of 10 UOPU is formed in the wheel on the unit circle $k$ at a point (in the present illustrative instance) 66° (angle $\theta$) displaced from the Reduced Mean Heavy Spot REMHS, as shown in Fig. 18. The formation of BLS results in the creation of a Balancing Heavy Spot BHS of the same weight×radius value as BLS. BHS may be considered to be centered on the unit circle $k$ diametrically opposite BLS. In the present illustrative instance, BHS is, therefore, displaced 114° from REMHS.

Figure 19:
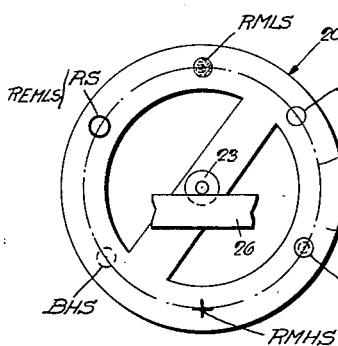

The wheel 20 will next be permitted to reorient itself by gravity to the position shown in Fig. 19 in which the REMHS and BHS combine to produce a Resultant Unbalance which may be considered to be centered in a Resultant Mean Heavy Spot RMHS located on the unit circle $k$ vertically beneath the staff 23 of the wheel. The Resultant Mean Heavy Spot RMHS will have a weight×radius value of 10 UOPU when both, the REMHS and BHS have a weight×radius value of 10 UOPU each. This may easily be observed by drawing a parallelogram, similar to that of Fig. 8, with the side $a$ equal to the weight×radius value of REMHS or 10 units, the other side $b$ equal to the weight×radius value of BHS or 10 units, and the angles 66° and 114° between its sides. The minor diagonal of the parallelogram will then indicate a value of 10 units which is the weight×radius value of the Resultant RMHS. If now a correcting cut is formed substantially coincident with RMHS and with a weight×radius value of 10 UOPU, corresponding to the value assigned to all cuts, the wheel (Fig. 20) will have perfect balance or poise. The correcting cut will leave in the wheel a Correcting Light Spot CLS diametrically opposite to which may be considered to be a Correcting Heavy Spot CHS of the same weight×radius value. Thus, although the wheel 20 was initially balanced, and was unbalanced during its subjection to the instant balancing operation, the wheel is nevertheless restored to perfect balance after its subjection to the balancing operation.

Figure 20:
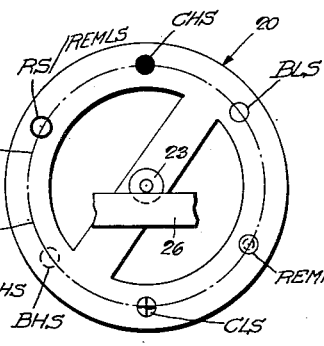
Figure 21:
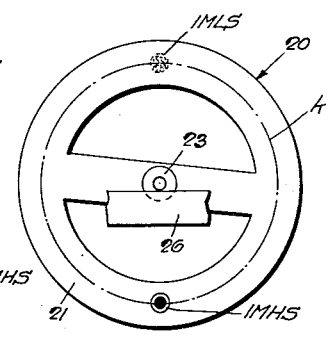
Figure 22:
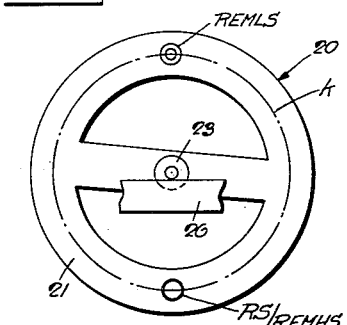
Figure 23:
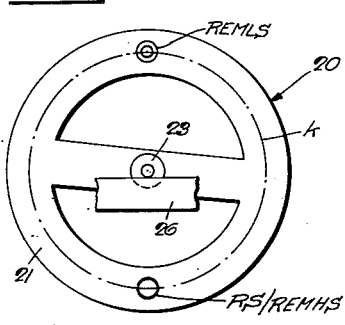
Figure 24:
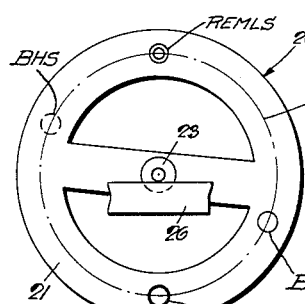
Figure 25:
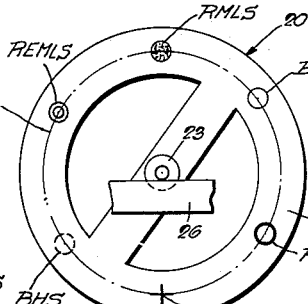
Figure 26:
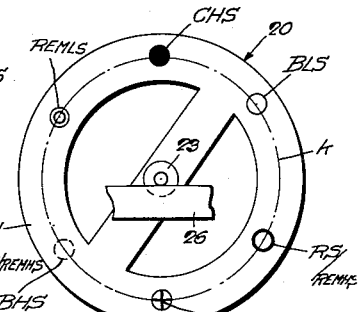

Assume now that another wheel 20 of the same lot, but with an initial unbalance of 20 UOPU, is to be balanced by the same operation as just described with reference to Figs. 15 to 20. Accordingly, the wheel 20 to be balanced (Fig. 21) has an initial unbalance equal to the maximum unbalance of the hereinbefore mentioned range of initial unbalances of the entire lot of members. Hence, on poising the wheel 20 for the first time, (Fig. 21), the unbalance of the wheel may be considered to be centered in the Inherent Mean Heavy Spot IMHS at the unit circle $k$ and vertically beneath the staff 23 of the wheel. As the next step in the method, a reducing cut of a value of 10 UOPU is undertaken at the location of IMHS, leaving the wheel with a Reducing Spot RS (Fig. 22) which in this instance is coincident with a Reduced Mean Heavy Spot REMHS. After permitting the wheel 20 to reorient itself by gravity (Fig. 23), the Reduced Mean Heavy Spot REMHS will be located bottommost. The REMHS is, in the present instance, equal in value to 10 UOPU, this being the difference between IMHS of the value of 20 UOPU and RS of the value of 10 UOPU. The formation of REMHS (Figs. 22 and 23) will result in the formation of a diametrically opposite Reduced Mean Light Spot REMLS of the same weight×radius value. At this stage of the balancing operation upon the instant wheel 20, the REMHS has the same weight×radius value as the wheel 20 at the corresponding stage (Fig. 17) of the preceding balancing operation. Accordingly, the remaining balancing operation as shown in Figs. 18, 19 and 20, when performed upon the instant wheel 20 in the manner shown in Figs. 24, 25 and 26 will result in perfect balancing of said wheel (Fig. 26).

While the wheels balanced according to the showings of Figs. 15 to 20 and Figs. 21 to 26 were given exemplary initial unbalances which produced optimum results after their balancing, all other wheels of the same lot having initial unbalances anywhere within the exemplary range of initial unbalance, i. e., from 0 to 20 UOPU, will be balanced to within 1 UOPU after their subjection to the balancing operation just described.

*The method as illustrated in Figs. 27 to 32, inclusive, and in Figs. 33 to 38, inclusive*

The balance wheels 20 of the lot to be balanced according to this method may be assumed to have initial unbalances varying between a maximum initial unbalance and a minimum initial unbalance other than zero. Thus, let it be assumed in this instance that the range of initial unbalances of the members of the lot extends from 10 to 30 UOPU. Accordingly, the preferred value of the Reducing Cut will be considered to be 20 UOPU, i. e., the mean value of the range of initial unbalances of the members of the lot. Further, the values assigned to the Balancing and Correcting Cuts (or weight additions) are, in the present example, 10 UOPU each.

Figure 27:
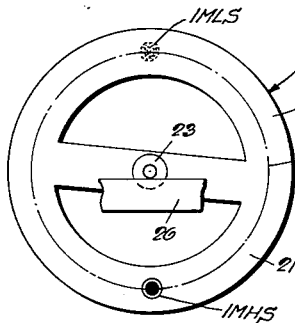
Figure 28:
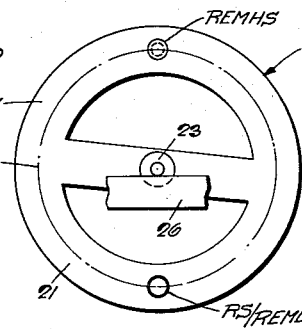
Figure 29:
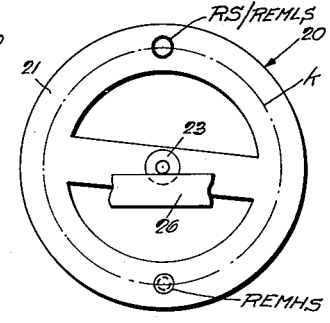
Figure 30:
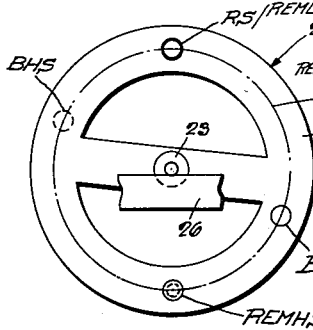

Let it now be assumed that the wheel 20 in Fig. 27 has an initial unbalance of 10 UOPU. Accordingly, the Inherent Mean Heavy Spot IMHS of the value of 10 UOPU will become located vertically beneath the staff of the wheel (Fig. 27) after the first poising of the latter. Next, RS of the selected value of 20 UOPU is formed at the location of IMHS (Fig. 28), leaving the wheel at the location of RS with a Reduced Mean Light Spot REMLS of a value of 10 UOPU, and with a Reduced Mean Heavy Spot REMHS of the same value diametrically opposite the coinciding RS and REMLS. Next, the wheel is permitted to reorient itself by gravity, bringing the REMHS bottommost (Fig. 29). Following the location of REMHS (Fig. 29), BLS of the selected value of 10 UOPU is formed in the wheel on the unit circle $k$ at a point (in the present illustrative instance) 66° (angle $\theta$) displaced from REMHS (Fig. 30). The formation of BLS brings about the formation of a diametrically opposite BHS of the same value.

Figure 31:
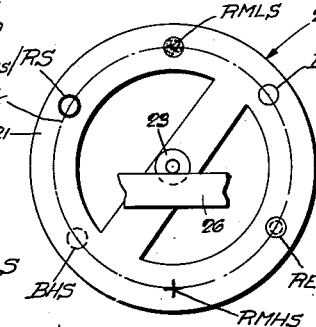
Figure 32:
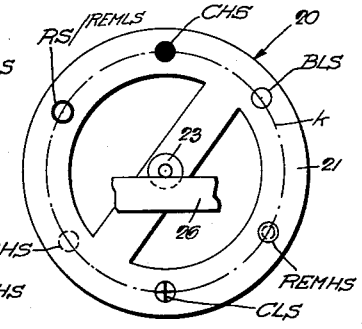
Figure 33:
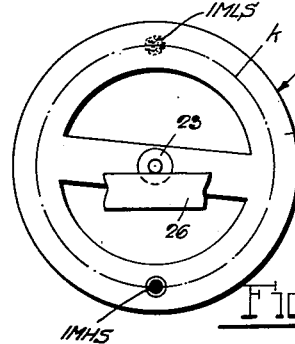
Figure 34:
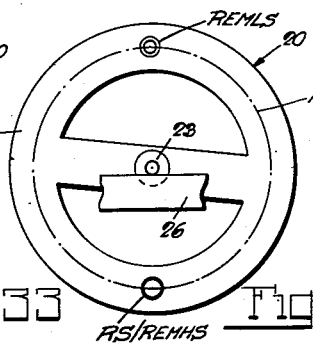

The wheel will next be permitted to reorient itself by gravity to the position shown in Fig. 31, in which REMHS and BHS combine to produce the Resultant Mean Heavy Spot RMHS vertically beneath the staff of the wheel, and also a Resultant Mean Light Spot RMLS of the same value as RMHS diametrically opposite the latter. RMHS will have a weight×radius value of exactly 10 UOPU when both the REMHS and BHS have a weight×radius value of 10 UOPU each. This may readily be observed by drawing a parallelogram, similar to that of Fig. 8, with a side $a$ equal to the weight×radius value of REMHS or 10 units, the other side $b$ equal to the weight×radius value of BHS or 10 units, and the angles 66° and 114° between its sides. The minor diagonal of the parallelogram will then indicate a value of 10 units which is the weight× radius value of the Resultant RMHS. If now a correcting cut CLS is formed substantially coincident with RMHS and with a weight×radius value of 10 UOPU (Fig. 32), the wheel will have perfect balance or poise.

Following is a description of the same balancing operation performed on a wheel 20 of the same lot of which the wheel of Figs. 27 to 32 is a part, but which distinguishes from the latter wheel by having the maximum initial unbalance of 30 UOPU. Accordingly, and with reference to Figs. 33 to 38, inclusive, the instant wheel 20 will on its first orientation by gravity assume the position shown in Fig. 33 in which the Inherent Mean Heavy Spot IMHS of the given value of 30 UOPU is located vertically beneath the staff of the wheel. Following the location of the Inherent Mean Heavy Spot IMHS, there is formed at IMHS the Reducing Spot RS of the selected value 20 UOPU (Fig. 34), forming thereby at the location of RS a Reduced Mean Heavy Spot REMHS of a value of 10 UOPU, and also a Reduced Mean Light Spot REMLS of the same value diametrically opposite REMHS. The wheel is next permitted to orient itself by gravity (Fig. 35), whereupon a Balancing Light Spot BLS of the selected value of 10 UOPU is formed on the unit circle $k$ at the angle $\theta$, in this instance 66°, from REMHS (Fig. 36). The formation of BLS will bring about the formation of a diametrically opposite BHS of the same value. The wheel is then permitted to reorient itself by gravity into the position shown in Fig. 37 in which the Resultant RMHS of the REMHS and BHS will be located vertically beneath the staff of the wheel. RMHS will have a weight ×radius value of exactly 10 UOPU when both, the REMHS and BHS have a weight×radius value of 10 UOPU each. This may readily be observed by drawing the same parallelogram referred to in the immediately preceding balancing operation (Figs. 27 to 32). Accordingly, if now a correcting cut CLS is formed substantially coincident with RMHS and with a weight×radius value of 10 UOPU (Fig. 38) the wheel will have perfect balance or poise.

While the wheels balanced according to the showings of Figs. 27 to 32 and Figs. 33 to 38 were given exemplary initial unbalances which produced optimum results after their balancing, all other wheels of the same lot having initial unbalances anywhere within the exemplary range of initial unbalances, i. e., from 10 to 30 UOPU, will be balanced to within 1 UOPU after their subjection to the balancing operation just described.

*The method as illustrated in Figs. 39 to 47 inclusive*

Inasmuch as the balance-wheels 20 before described herein are relatively thin, the static balancing thereof as before described will also serve to effectively dynamically balance the same in the event that it is desired to employ a structure like the balance-wheels 20 as a high-speed rotating member. Thus, the relatively-narrow flywheels commonly employed in automobile engines and the like may have imparted to them satisfactory dynamic balance by practising the same method for eliminating or reducing to a minimum the components of the dynamic unbalance.

In instances, however, where it is desired to dynamically balance a member having appreciable dimensions in the direction of the axis of rotation, it is advisable to employ the method of balancing of the present invention in a manner as will presently appear.

For purposes of illustrating one mode of dynamically balancing a member in accordance with the method of the present invention, let it be assumed that a lot of members 29 such as is shown in Figs. 39 to 47 inclusive, is of such character that the range of their initial unbalances is between 0 and 20 UOPU. As shown, the member 29 is provided at its opposite ends respectively with stub-shafts 30 and 31 about the common axis of which the member may turn.

Let it further be assumed that the selected member 29 now to be balanced actually has 15 UOPU with its effect centered about a location one-third the distance from the right end of the member as shown in Fig. 39, and hence two-thirds of the distance from the left end of the member. It is to be further assumed that the effect of said 15 UOPU is centered on the unit-circle $k$ about the indications IMHS respectively appearing in Figs. 39, 40 and 44.

Due to the fact, however, that IMHS as indicated in Fig. 39 is twice as close to the right end of the member as it is to the left end thereof, the effect of the 15 UOPU may be said to appear as components in the two end-planes of the member; the component at the left end-plane of the member, as indicated in Fig. 40, will have a value of but 5 UOPU at the point shown, and for similar reasons the corresponding component of the IMHS located as in Fig. 39, may be said to appear at the right end-plane of the member, as indicated in Fig. 44, with a value of 10 UOPU and at the position shown.

The components of IMHS may be located at both ends of the member 29 by means of any well-known apparatus now available, without, however, requiring the ascertainment of the actual value of IMHS for each individual member of the lot of similar members like 29. Such known apparatus may fix the location of the components of the dynamic unbalance at both ends of a rotating body from records of the vibrations of the latter, for instance.

After thus locating IMHS at the left end of the member 29, a reducing cut RS (Fig. 41) may be undertaken at IMHS (or weight of a similar value may be added at the diametrically opposite IMLS). Again, it is preferred to make the Reducing Cut in this instance equal to the mean unbalance of the range of initial unbalances of the lot of members 29. Accordingly, the weight×radius value of RS is 10 UOPU. The formation of RS of a weight×radius value of 10 UOPU at the IMHS of 5 UOPU results in the formation of a diametrically opposite Reduced Mean Heavy Spot REMHS of a value of 5 UOPU. After locating REMHS, a Balancing Light Spot BLS is formed in the same left end of the member 29 (Fig. 42) with a pre-selected weight×radius value of 10 UOPU, to thus create BHS at a diametrically-opposite point and having a similar value. Under the circumstances now being considered, BLS as indicated in Fig. 42, is to be located approximately 66° from REMHS, thus locating BHS about 114° on the other side of REMHS.

Also under the circumstances above described and after the formation of BLS and BHS in the left end of the member 29, the Resultant of REMHS and BHS, namely RHMS, will have a weight×radius value of 10 UOPU and will appear intermediate BHS and REMHS (Fig. 42).

The Resultant Mean Heavy Spot RMHS at the left end of member 29 may then be located by means of the same apparatus by which the corresponding component of the original IMHS has been located. If now, at the site of the located RMHS (or substantially on a radial line coincident therewith), CLS is cut (Fig. 43) with a pre-selected weight×radius value of 10 UOPU, the remaining unbalance in the left end of the member 29 will be zero. With the left end of the member 29 thus statically balanced, the latter is, of course, still dynamically unbalanced when rotated with its stub-shafts 30 and 31 in suitable journal-bearings (not shown), because the right end of the member 29 is, by virtue of the component inherent maximum heavy spot thereat, neither statically nor dynamically balanced.

Now let the right end of the member 29 be considered. As already mentioned, the IMHS there located has a value of 10 UOPU (Fig. 44). After locating IMHS by means of the same apparatus by which IMHS at the left end of member 29 was located, a Reducing Spot RS of the preselected value of 10 UOPU is formed at the location of IMHS (Fig. 45) leaving the right end of member 29 perfectly balanced in this instance. The operator, not knowing this, will nevertheless endeavor to locate a Reduced Mean Heavy Spot REMHS, whether real or non-existing, by means of the same apparatus by which the corresponding IMHS has been located. Thus, REMHS, having in the present instance a value of zero, may be located, as in Fig. 46.

BLS may next be formed as indicated in Fig. 46, also with the preselected weight×radius value of 10 UOPU and at approximately 66° from REMHS, which will result in the formation of a diametrically opposite BHS also with a value of 10 UOPU. Under these circumstances, RMHS in the right end of the member 29, when located by means of the before-mentioned apparatus, will appear at the location of BHS (Fig. 46) and will have a weight×radius value of 10 UOPU.

Now when RMHS (10 UOPU) is overcome by the formation of CLS with the preselected value of 10 UOPU and as indicated in Fig. 47, the remaining unbalance in the right portion of the member 29 will be zero. The entire member 29 is now dynamically balanced to all practical intents and purposes.

All other members of the lot similar to the member 29 may be treated in identical manner to thus bring them into a condition wherein the remaining unbalance considered as effective at the respective end-planes of a member, is 1 UOPU or less.

While in the present example of dynamically balancing the member 29 the cuts (or weight additions) were made on the opposite end faces of the member, it is obvious that these cuts may be made on other planes of the member, such as on separate discs mounted on the member but spaced from or adjacent the respective end faces of the member.

The various values set forth above for illustrative purposes may be ascertained or chosen in a variety of manners, such, for instance, as is set forth in the Résumé.

While in the hereinbefore described balancing operations the various cuts (or weight additions, if desired) are provided on a unit-circle $k$, it is, of course, feasible to place any one cut (or weight addition) on a wheel at a place other than the unit-circle $k$ thereof, as long as such cut (or weight addition) has the required weight×radius value. Also, and as previously mentioned, wheels may be balanced according to the present method by providing the same with a series of cuts or weight additions, or a combination of cuts and weight additions. Figs. 37A and 38A show an example of a wheel balanced according to the present method by a combination of cuts and weight additions. Thus, the wheel there shown has a Reducing Spot RS, a weight addition W at BHS, and a Correcting Light Spot CLS. Another example of a wheel balanced according to the present method by a combination of cuts and weight additions is shown in Figs. 39A and 40A. This wheel has a Reducing Spot RS, a Balancing Light Spot BLS and a weight addition W at the Correcting Heavy Spot CHS. Furthermore, RS and BLS are located on the unit-circle $k$, while CHS and CLS are located inwardly of the unit-circle $k$.

In the hereinbefore described balancing operations, the Reducing Cut RS was made equal to the mean unbalance of the range of initial unbalances of the members of a lot. While this produces optimum results, the present method is by no means limited to the provision of a Reducing Cut (or weight addition) the value of which equals the mean unbalance of the range of initial unbalances of the members of a lot. To achieve the before-mentioned desired objectives, it is merely necessary that the Maximum Reduced Mean Unbalance REMHS max is smaller than the Maximum Inherent Unbalance IMHS max of the members of a lot.

Reference is now had to Figs. 48 to 52, inclusive, which show different relations of vectors representing the weight×radius values of Reducing Cuts RS and Inherent Mean Unbalances IMHS. Thus, Fig. 48 shows an IMHS vector representing a range from 0 to IMHS max for a given lot of members, and an RS vector of a value of one half the range of IMHS, i. e. one-half of IMHS max. The relationship between these vectors applies to the described balancing operations shown in Figs. 1 to 7, 9 to 14, 15 to 20 and 21 to 26, respectively, which bring optimum results. According to these related vectors, the REMHS max equals RS or one half IMHS max, and REMHS max occurs when IMHS is zero or maximum. For all other values of IMHS within the range, REMHS is smaller than REMHS max.

Consider now the relation of the IMHS and RS vectors of Fig. 49. In this particular instance, RS is made equal to three-fourths of IMHS max, in which case REMHS max will be equal to RS, and occur only when IMHS is zero. However, even under these most unfavorable conditions, REMHS max is still considerably smaller than IMHS max. For any other value of IMHS the value of REMHS is smaller than its maximum value.

Thus, a member of an IMHS of the extent o—a in Fig. 49 will, after being provided with the selected RS, have a REMHS of the extent c—a. A member of an IMHS of the extent o—b will, after the provision of RS, have a REMHS of the extent c—b. A member of an IMHS of the extent o—c will, after the provision of RS, have no effective REMHS and will be in perfect balance. A member having the IMHS max will, after the provision of RS, have a REMHS of the extent c—d. Fig. 49 shows only one example of a possible relationship between RS and IMHS max, and it is now fully understood that the value of RS may be chosen as desired, as long as the maximum Reduced Mean Unbalance REMHS max is smaller than IMHS max.

Consider now the relation of the IMHS and RS vectors in Fig. 50. The relationship of these vectors applies to the balancing operation shown in Figs. 27 to 32 and Figs. 33 to 38, respectively, in which the range of initial unbalances of the members of a lot lies between IMHS max and IMHS min other than zero, and the value of RS is chosen equal to the mean unbalance of the range of initial unbalances for optimum results. Accordingly, Fig. 50 shows the RS vector as having a value equal to the mean unbalance of the range between IMHS max and IMHS min. Under these conditions, the value of REMHS max will be equal to one-half the difference between IMHS max and IMHS min, and will occur when IMHS is at a minimum or a maximum. REMHS will be zero when IMHS is equal to the mean unbalance of the range of initial unbalances. For all other values of IMHS within the range, REMHS is smaller than the maximum value thereof.

Consider now the relation of the RS and IMHS vectors of Fig. 51. The IMHS vector is similar to that of Fig. 50, and defines a range of initial unbalances between IMHS max and IMHS min other than zero, but the RS vector has a value which, in this instance, is equal to that of IMHS min. Accordingly, REMHS max equals IMHS max–IMHS min, and is, therefore, considerably smaller than IMHS max. REMHS max occurs when IMHS is at its maximum. REMHS is zero when IMHS is at its minimum. For all other values of IMHS within the range, REMHS is less than the maximum thereof.

Consider next the relation between the RS and IMHS vectors in Fig. 52. Again the IMHS vector defines a range of initial unbalances between IMHS max and IMHS min other than zero, while the RS vector has been given a value equal to IMHS max. Under these circumstances, the maximum Reduced Mean Unbalance REMHS max is equal to IMHS max—IMHS min, and is, therefore, considerably smaller than IMHS max. REMHS max occurs when IMHS is at its minimum, and REMHS is zero when IMHS is at its maximum. For all other values of IMHS within the range REMHS is less than the maximum thereof.

It follows from Figs. 51 and 52 that, for a range of initial unbalances between IMHS max and IMHS min other than zero, RS may be chosen as desired, as long as the maximum Reduced Mean Unbalance REMHS max is smaller than IMHS max.

Résumé

Assuming that the maximum initial unbalance present in any member of a selected group or lot of similar rotary or oscillatory members (as originally manufactured or as partly corrected for unbalance) is known, the minimum initial unbalance of one or more members of the lot is zero, and the maximum permissible remaining unbalance is decided upon, the method of the present invention may be explained as follows:

(1) With respect to each member of the lot of similar members, there is provided a known unbalance (RS) which counteracts the particular initial unbalance (IMHS) and produces on a diametric line passing through the initial unbalance (IMHS) a Reduced Mean Heavy Spot (REMHS) the exact unbalance of which is unknown, but is known to be less than the maximum initial unbalance of the members of the lot;

(2) A known unbalance (BLS or BHS) is next provided so as to produce a light spot effect at an acute angle (from about 20° to about 85°) with respect to the Reduced Mean Unbalance (REMHS), so that the resultant (RMHS or RMLS) of the two unbalances will be such as to correspond (within 1 UOPU) in value to the mean value of all of the RMHS values of the lot and, hence, all of the latter values will be substantially alike; and (3) With the Resultants for all members of the lot being substantially alike as above-mentioned, a fixed or known correction (CLS or CHS) corresponding in value (within 1 UOPU) to both the maximum and minimum of said Resultants, is then made in each member of the lot to thus leave little or no remaining unbalance.

According to this invention, each member of a group or lot of similar members having an unknown initial unbalance IMHS which does not exceed a predetermined maximum and for which has been substituted an unknown REMHS which is, however, smaller than the IMHS max of the members of the lot, has a known unbalance (BLS) effect produced therein at a predetermined acute angle from REMHS whereby a Resultant Mean Unbalance (RMHS or RMLS) is produced. By the original selection of the said angle and of the known unbalances RS and BLS (constant for all members of the said lot) in relation to the known range of manufacturing or other pre-processing error in the group of members (IMHS from zero to a selected known maximum) and the permissive operational tolerance (UOPU), this RMHS becomes substantially the same (within the permissive tolerance) for all the members of the lot. Hence, the correction by a known amount (e. g., by drilling the correcting spot of known weight at a known radius), will bring each member of the group finally within the permissible limit of remaining unbalance. The weight×radius value of the balancing spot need not be large compared to the weight×radius value of REMHS maximum, and at least two different values of REMHS will provide the same Resultant so that substantially absolute correction is provided for at least two values of REMHS, as well as greatly reduced remaining unbalances in members of the lot having intermediate values of REMHS.

It will be clear that in carrying out the present invention, the creation of a Reduced Mean Heavy Spot REMHS as the result of the removal or addition of material, inevitably results in the creation of a diametrically opposite Reduced Mean Light Spot REMLS of the same weight×radius value. Further, the removal of material to produce the Balancing Light Spot BLS, inevitably results in the creation of a Balancing Heavy Spot effect BHS of equal weight×radius value which may be considered to be centered on the opposite side of the center of the member from BLS and on a diametrical line extending through both the said center and BLS. Similarly, by adding weight to provide the Balancing Heavy Spot BHS, there is automatically produced a diametrically opposite Balancing Light Spot effect BLS of corresponding weight×radius value. The same effects occur in connection with the creation of CHS and CLS.

General formula

Disregarding for the moment that REMHS is substituted for IMHS by the present method, the general formula for the resultant unbalance from the combined effects of any Inherent Mean Unbalance Spot (IMHS or IMLS) and any Balancing Spot (BHS or BLS) is substantially:

Resultant =
$$\sqrt{\left(\begin{matrix}IMHS^2\\or\\IMLS^2\end{matrix}\right)+\left(\begin{matrix}BHS^2\\or\\BLS^2\end{matrix}\right)-2\left(\begin{matrix}IMHS\\or\\IMLS\end{matrix}\right)\left(\begin{matrix}BHS\\or\\BLS\end{matrix}\right)\cos\theta}$$

where $\theta$ is the angle between IMHS and the effective Balancing Light Spot BLS, and where IMHS and both BLS and BHS are respective weight×radius values. Applying this general formula to the instant balancing method where the Inherent Mean Unbalance IMHS is replaced by a Reduced Mean Unbalance REMHS, the result will then be (Fig. 8):

Resultant =
$$\sqrt{\left(\begin{matrix}REMHS^2\\or\\REMLS^2\end{matrix}\right)+\left(\begin{matrix}BHS^2\\or\\BLS^2\end{matrix}\right)-2\left(\begin{matrix}REMHS\\or\\REMLS\end{matrix}\right)\times\left(\begin{matrix}BHS\\or\\BLS\end{matrix}\right)\times\cos\theta}$$

Accordingly, if the Balancing Light Spot BLS is located at more than 90° from the Reduced Mean Heavy Spot REMHS, then its effect adds to the reduced unbalanced lightness of the members, inasmuch as for angles from 90° to 180° inclusive cos $\theta$ becomes negative. If BLS is located at exactly 90° from REMHS, then it has no vertical vectorial component which adds to or subtracts from the reduced unbalance, since the cos $\theta$ of 90° is always zero, as will be obvious from the vectorial relations.

From the foregoing it will be clearly apparent that the locating of BLS at any angle intermediate of and including the angles 90° and 180°, will provide a Resultant Mean Heavy Spot which in all cases will be greater than the Reduced Mean Heavy Spot, and furthermore, this RMHS, for all values of REMHS other than zero, will also be greater than the Balancing Light Spot. It is further to be noted that should any of the angles just referred to be utilized in the manner described, the Resultant Mean Heavy Spot will always increase in value as the value of REMHS increases and, in fact, RMHS will not have identical values for two different values of REMHS as will be the case under the present invention.

In accordance with the present invention, the more the angle between BLS and REMHS is reduced below 90°, the greater is the vertical vectorial component thereof, which serves to counteract REMHS, but on the other hand, as this angle is reduced, the vectorial component thereof at a right angle to the vertical line through REMHS will decrease and as the said angle approaches zero, this component will produce a Resultant Mean Heavy Spot vector having too great a range to be readily compensated for by a CLS value which is standard for a lot of members. Hence, the optimum angle $\theta$ depends upon the weight×radius value of the maximum Reduced unbalance, upon the weight×radius value of the change produced by BLS, upon the weight×radius value of the Correcting Spot, and upon the Permissible Unit of Unbalance.

By locating BLS at an acute angle ($\theta$) from REMHS in accordance with the present invention, BLS always supplies a vertical vectorial component which subtracts from the REMHS maximum vector. Furthermore, RMHS will have identical values for at least two different values of REMHS, all as has been previously described and as will be clearly apparent by reference to Figs. 53 and 54.

The method of the present invention may be further explained by means of vector diagrams such, for instance, as those shown in Figs. 53 and 54, which are respectively laid out to fit different sets of specific circumstances, for illustrative purposes.

For example, where it is desirable to add or remove the least amount of material to effect a given accuracy of balancing, the Correcting Spots preferably should be less than the Balancing Spots. Fig. 53 shows the vectorial relations to provide optimum conditions when the Correcting Spot is less than the Balancing Spot, although good results can also be obtained (as is also indicated) under the particular conditions wherein the Balancing Spots and Correcting Spots are alike.

Under conditions wherein it may be desirable to provide Balancing Spots and Correcting Spots of substantially equal weight×radius values (which under some conditions afford advantages), Fig. 54 shows the basic vectorial relations to provide optimum results.

The foregoing explanations show optimum values from which anyone skilled in the art can select conditions that deviate from those shown, but which will still provide excellent and satisfactory results.

It may again be noted that the values referred to are those represented by products of weight and the radial distances thereof. Such "weight×radius value" will be the same whether produced by a small mass at a large radial distance or a larger mass at a smaller radial distance.

The showing of Fig. 53

Attention may first be called to the fact that the vector diagram of Fig. 53 is constructed primarily to fit conditions wherein it is desired to remove or add a minimum amount of material in order to secure satisfactory balancing in the lot of members. Accordingly, the vector diagram of Fig. 53 is particularly pertinent to the showing and description of Figs. 11A to 14A.

The trigonometric and vectorial relation can be seen from Fig. 53, where REMHS is designated by a heavy vector line downward from the axis O. A Balancing Light Spot BLS is also shown as a vector lying at an angle $\theta$ from the vector of REMHS. The Balancing Light Spot BLS will have its complement in a Balancing Heavy Spot of equal weight×radius value represented by the heavy vector line BHS located 180° from the BLS vector. The scalar lengths of these vectors can be fixed by the weight×radius values of the respective unbalances REMHS and BLS. To obtain the resultant of these two vectors, a vertical dotted line is drawn parallel to the REMHS vector and through the end A of the BHS vector. A vector (REMHS)$_B$ is then laid off along the dotted line from the point A and equal to the vector value of REMHS for an individual member of the lot being treated and the resultant vector RMHS for the member referred to, is drawn from the axis O to the end of the individual vector (REMHS)$_B$. Obviously, the dotted line through point A comprises the loci of the resultant vectors for all the members of a chosen lot, since REMHS varies from zero to the predetermined maximum, and for such predetermined REMHS maximum, there corresponds the vector (REMHS)$_B$ maximum equal to A—B.

A circular arc is struck about the axis O through the point A. This arc represents the weight×radius value of the Balancing Heavy Spot vector, and under circumstances where a lot of members is being balanced by employing Correcting Heavy Spots identical in weight×radius value with each other and with the similar value to the Balancing Heavy Spots, this arc also represents the effect of such a Correcting Spot. Thus, the resultant vector RMHS (individual for each member of the lot) from the axis to the straight vertical dotted line A—B corresponds to the correction demanded for perfect balance, while a vector coincident therewith and extending to the said arc will represent the correction effect obtained simply by a Correcting Light Spot (or its equivalent Correcting Heavy Spot) when equal in weight×radius effect to the Balancing Heavy Spot. The scalar difference between these vectors is the remaining error present, which will be zero at A and B, and at points between A and B will be no greater than a maximum of BHS (1—sine $\theta$), and this maximum will occur when the REMHS of the individual member is one-half of the predetermined maximum REMHS, that is, when REMHS has a mean value (REMHS mean) and the corresponding resultant intersects the dotted vertical line at one-half the distance from A to B.

It will be apparent from Fig. 53, that there will be numerous pairs of identical RMHS values respectively appearing at equal distances above and below the horizontal axis.

Under the above-described circumstances, $$\cos \theta = \frac{\text{REMHS maximum}}{2 \text{ BHS}}$$

or its equivalent $$\frac{\text{REMHS mean}}{\text{BHS}}$$

and the maximum remaining unbalance in any member of the lot would be BHS $(1 - \sin \theta)$.

It will also be noted from the foregoing and by reference to Fig. 53, that the values of RMHS vary from equality with the value of BHS down to a lesser value which is equal to BHS sine $\theta$ (which occurs when $$\text{REMHS} = \frac{\text{REMHS maximum}}{2})$$

and the RMHS value for individual members thereafter increases until it is equal to the BHS, under which conditions REMHS=REMHS maximum. The mean RMHS will therefore be less than BHS and will equal $$\frac{\text{BHS}\theta + \text{BHS sine}}{2}$$

By applying a CHS (or CLS) equal to the mean RMHS rather than equal to the BHS as above explained, the remaining unbalance or final error would be 50% of what it would be if CHS had been equal in value to BHS, though the latter relationships are suitable for many purposes. A dotted arc L shows such a mean RMHS value, in which circumstance the maximum remaining unbalance in any member of the lot will be equal to $$\frac{\text{BHS}}{2} (1 - \sin \theta)$$

instead of BHS $(1 - \sin \theta)$.

Under circumstances where REMHS is either zero or maximum, then RMHS will be equal to BHS as is clearly apparent from Fig. 53, and optimum results (least remaining unbalance) will be obtained by using a CHS (or CLS) equal to $$\frac{\text{BHS} + \text{BHS sine } \theta}{2}$$

or $$\frac{\text{BHS}}{2} (1 + \sin \theta)$$

which for acute values of $\theta$ will be less than BHS.

When the relationships outlined in the two immediately preceding paragraphs are employed, highly satisfactory results are achieved with the minimum removal or addition of material.

If it is desired to operate under the guidance of the teachings of Fig. 53 (wherein RMHS=BHS when REMHS=zero or maximum), basically similar vector diagrams may be constructed or the following mathematical formula may be used to determine the values of BHS (or BLS), CHS (or CLS) and $\theta$, and in which formula any desired maximum Remaining Unbalance expressed in UOPU (such, for instance, as 0.5, 0.8, or 1.0 UOPU), may be substituted for RU (Remaining Unbalance).

When it is desired to have CHS (or CLS) equal to the mean RMHS of the lot of members, then BHS(or BLS) =

$$\frac{\text{REMHS maximum}^2 + 16 \text{ (RU maximum)}^2}{16 \text{ (RU maximum)}}$$

$$\cos \theta = \frac{\text{REMHS maximum}}{2 \text{ BHS}}$$

or $$\frac{\text{REMHS mean}}{\text{BHS}}$$

and $$\text{CHS (or CLS)} = \frac{\text{REMHS maximum}^2}{16 \text{ (RU maximum)}}$$

In instances where it is desired to have CHS (or BLS) equal to BHS when $\theta$ has the values just above given, then both BHS (or BLS) and CHS (or CLS) =

$$\frac{\text{REMHS maximum}^2 + 4 \text{ (RU maximum)}^2}{8 \text{ (RU maximum)}}$$

These latter relationships, while satisfactory when CHS is equal to BHS, do not effect optimum results, which optimum may be better attained by following the guidance of the teachings of Fig. 54 for reasons as will later appear.

*The showing of Fig. 54*

In connection with Fig. 53, it was shown that the least remaining unbalance occurred when the CHS (or CLS) was less than the BHS and equal to the mean RMHS. If it is desired to make the minimum weight-changes and to use identical values for both BHS and CHS, as for instance by using the same drill, cutting tool or weight additions, optimum results can best be achieved by operating under the guidance of Fig. 54.

Thus, such results may be accomplished by selecting conditions so that the mean RMHS is equal to BHS instead of being less. Fig. 54 shows these latter conditions in which RMHS varies equally above and below the value of BHS. The vector diagram of Fig. 54 is particularly pertinent with respect to the showing of Figs. 15 to 20 inclusive, or the showing of Figs. 21 to 26, inclusive.

In Fig. 54, BHS and REMHS are constructed as in Fig. 53, except that the angle $\theta$ has been selected at a different value. The value of REMHS will appear as an REMHS vector and is laid off along the dotted line CF, which latter represents the maximum value of REMHS. Under these circumstances, the dotted line CF comprises the loci of the resultant RMHS of all the members of the lot since REMHS varies from zero to the predetermined maximum.

Under the circumstances just above referred to, $\cos \theta$ will no longer equal $$\frac{\text{REMHS maximum}}{2 \text{ BLS}}$$

(or its equivalent $$\frac{0.5 \text{ REMHS maximum}}{\text{BLS}})$$

but will equal about $$\frac{0.415 \text{ REMHS maximum}}{\text{BLS}}$$

The value 0.415 may be obtained by calculating the relation of CD to DF when REMHS maximum is substantially greater than 1 UOPU.

The trigonometric values are also indicated in Fig. 54. The maximum remaining unbalance will again be BHS $(1 - \sin \theta)$ as it was also indicated in Fig. 53, but $\theta$ will have a different value from that indicated in Fig. 53 for a given ratio of BLS to REMHS maximum.

If it is desired to operate under the guidance of the teachings of Fig. 54, basically similar vector diagrams may be constructed for each set of conditions similar to those above discussed, or the following formula may be employed to determine the values for BHS (or BLS).

CHS (or CLS) and $\theta$, and in which formula any desired maximum remaining unbalance expressed in UOPU, may be substituted for RU.

$$BHS \text{ (or BHS)} = \frac{(.172)(REMHS \text{ maximum})^2 + (RU \text{ maximum})^2}{2(RU \text{ maximum})}$$

$$CHS \text{ (or CLS)} = BHS \text{ (and BLS)}$$

$$\cos \theta = \frac{0.415 \ REMHS \text{ maximum}}{BHS}$$

From all of the foregoing considered in conjunction with the accompanying drawings, it will be apparent that for any given lot of members, all Balancing Light Spots are substantially identical in weight×radius value with each other and are disposed at a pre-set standard acute angle ($\theta$) with respect to the Reduced Mean Heavy Spots of the members. Thus, the pre-set standard angle and the pre-set weight × radius value of the said Correcting Light Spots are related to produce in each member of the lot, a Resultant Mean Heavy Spot which for all members of the lot, is within 1 UOPU of the mean value of all of the Resultant Mean Heavy Spot values of the lot, and also the Correcting Light Spots.

The said Correcting Light Spots, in turn, have a weight×radius value which is within 1 UOPU of the respective weight×radius values of any of the Resultant Means Heavy Spots in a lot of members.

From all of the preceding examples, it will be clearly apparent that while the respective weight×radius values of the standard Balancing Light Spots and the standard Correcting Light Spots may differ from each other by a plurality of UOPU's, nevertheless, the value assigned to the Correcting Light Spots is always such as to be within 1 UOPU of the Resultant Mean Light Spot eventuating from the combined effects of the reduced mean unbalance and the Balancing Light Spots.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method of balancing by a standardized procedure a plurality of similar rotary members having respective inherent unbalances within a range between preset maximum and minimum unbalances of which the preset maximum unbalance is greater than the maximum permissible remaining unbalance for each member, said method comprising the steps of locating the respective inherent mean heavy spots, if any, of said members; changing the weights of local portions of the respective members on diametric lines thereof passing through the respective inherent mean heavy spots, if any, by a first standard weight×radius value substantially identical for each member to provide said members with reduced mean heavy spots, respectively, in which the then remaining resultant unbalances of the respective members are centered, and which have weight×radius values, respectively, smaller than the maximum weight×radius value of the inherent mean heavy spots of all of said members; locating the respective reduced mean heavy spots of said members; changing the weights of local portions of the respective members by second standard weight×radius values, respectively, substantially identical for each member, to provide said members with balancing light spots angularly displaced from their respective reduced mean heavy spots by a standard angle from about 20° to about 85°, said standard angle and the weight×radius value of each of said substantially identical balancing light spots being related to each other and to the maximum weight×radius value of the reduced mean heavy spots of all of said members to produce in each of said members a resultant mean unbalance spot corresponding in weight×radius value, within plus or minus the weight× radius value of said maximum permissible remaining unbalance, to the mean of the weight×radius values of the resultant mean unbalance spots of all of said members; subsequently locating the respective resultant mean unbalance spots of said members; and again changing the weights of local portions of the respective members by third standard weight×radius values, respectively, substantially identical for each member, to provide said members with correcting light spots, respectively, effective at locations substantially coincident with radial lines passing through the respective resultant mean unbalance spots, and therewith bringing each of said members within said maximum permissible remaining unbalance, the weight×radius value of the correcting light spot of any of said members corresponding, within the value of said maximum permissible remaining unbalance, to the weight×radius value of the resultant mean unbalance spot of the same member.

2. The balancing method as set forth in claim 1, in which said first, second and third weight×radius values of the respective weight changes of said members are selected to be alike.

3. The balancing method as set forth in claim 1, in which said first weight×radius values are larger than either of said second and third weight×radius values.

4. The balancing method as set forth in claim 1, in which said first weight×radius values are smaller than either of said second and third weight×radius values.

5. The method of balancing by a standardized procedure a plurality of similar rotary members having respective inherent unbalances within a range between preset maximum and minimum unbalances of which the preset maximum unbalance is greater than the maximum permissible remaining unbalance for each member, said method comprising the steps of locating the respective inherent mean heavy spots, if any, of said members; changing the weights of local portions of the respective members on diametric lines thereof passing through the respective inherent mean heavy spots, if any, by a first standard weight×radius value substantially identical for each member and equal to that of the mean unbalance of said range to provide said members with reduced mean heavy spots, respectively, which counteract the respective inherent mean unbalances and in which the then remaining resultant unbalances of the respective members are centered; locating the respective reduced mean heavy spots of said members; changing the weights of local portions of the respective members by second standard weight×radius values, respectively, substantially identical for each member, to provide said members with balancing light spots angularly displaced from their respective reduced mean heavy spots by a standard angle whose cosine is from about 0.4 to about 0.6 of the ratio of the mean unbalance of said range to said second standard weight×radius value, said reduced mean heavy spots and balancing light spots creating in each member a resultant mean unbalance spot; locating the respective resultant mean unbalance spots of said members; and again changing the weights of the respective members by third standard weight×radius values, respectively, substantially identical for each member, to provide said members with correcting light spots, respectively, effective at locations substantially coincident with radial lines passing through the respective resultant mean unbalance spots, and therewith bringing each of said members within said maximum permissible remaining unbalance, the difference in weight×radius value between said second and third standard weight×radius values being not substantially more than the weight×radius value of said maximum permissible remaining unbalance.

6. The method of balancing by a standardized procedure a plurality of similar rotary members having respective inherent unbalances within a range between preset maximum and minimum unbalances of which the preset maximum unbalance is greater than the maximum permissible remaining unbalance for each member, said method comprising the steps of locating the respective inherent mean heavy spots, if any, of said members; changing the weights of local portions of the respective members on diametric lines thereof passing through the respective inherent mean heavy spots, if any, by a first standard weight×radius value substantially identical for each member and equal to that of the mean unbalance of said range to provide said members with reduced mean heavy spots, respectively, which counteract the respective inherent mean unbalances and in which the then remaining resultant unbalances of the respective members are centered; locating the respective reduced mean heavy spots of said members; changing the weights of local portions of the respective members by second standard weight×radius values, respectively, substantially identical for each member, to provide said members with balancing light spots angularly displaced from their respective reduced mean heavy spots by a standard angle from about 20° to about 85°, said standard angle and the weight×radius value of each of said substantially identical balancing light spots being related to each other and to the maximum weight×radius value of the reduced mean heavy spots of all of said members to produce in each of said members a resultant mean unbalance spot corresponding in weight×radius value, within plus or minus the weight×radius value of said maximum permissible remaining unbalance, to the mean of the weight×radius values of all the resultant mean unbalance spots of said members; subsequently locating the respective resultant mean unbalance spots of said members; and again changing the weights of the respective members by third standard weight×radius values, respectively, substantially identical for each member, to provide said members with correcting light spots, respectively, effective at locations substantially coincident with radial lines passing through the respective resultant mean unbalance spots, and therewith bringing each of said members within said maximum permissible remaining unbalance, the weight×radius value of the correcting light spot of any of said members corresponding, within the value of said maximum permissible remaining unbalance, to the weight×radius value of the resultant mean unbalance spot of the same member.

References Cited in the file of this patent

UNITED STATES PATENTS

| | | |
|---|---|---|
| 2,079,902 | De Witt | May 11, 1937 |
| 2,195,252 | McKinley et al. | Mar. 26, 1940 |
| 2,449,429 | Van Degrift et al. | Sept. 14, 1948 |
| 2,554,033 | Kohlhagen | May 22, 1951 |